Oct. 28, 1958 W. A. GIBBONS ET AL 2,857,924
SLEEPING AND TRAVELING EQUIPMENT FOR AUTOMOBILES
Filed May 25, 1955 4 Sheets-Sheet 1

INVENTORS
WESLEY A. GIBBONS & TERENCE G HARE
BY
Barnes Kisselle Laughlin & Raisch
ATTORNEYS.

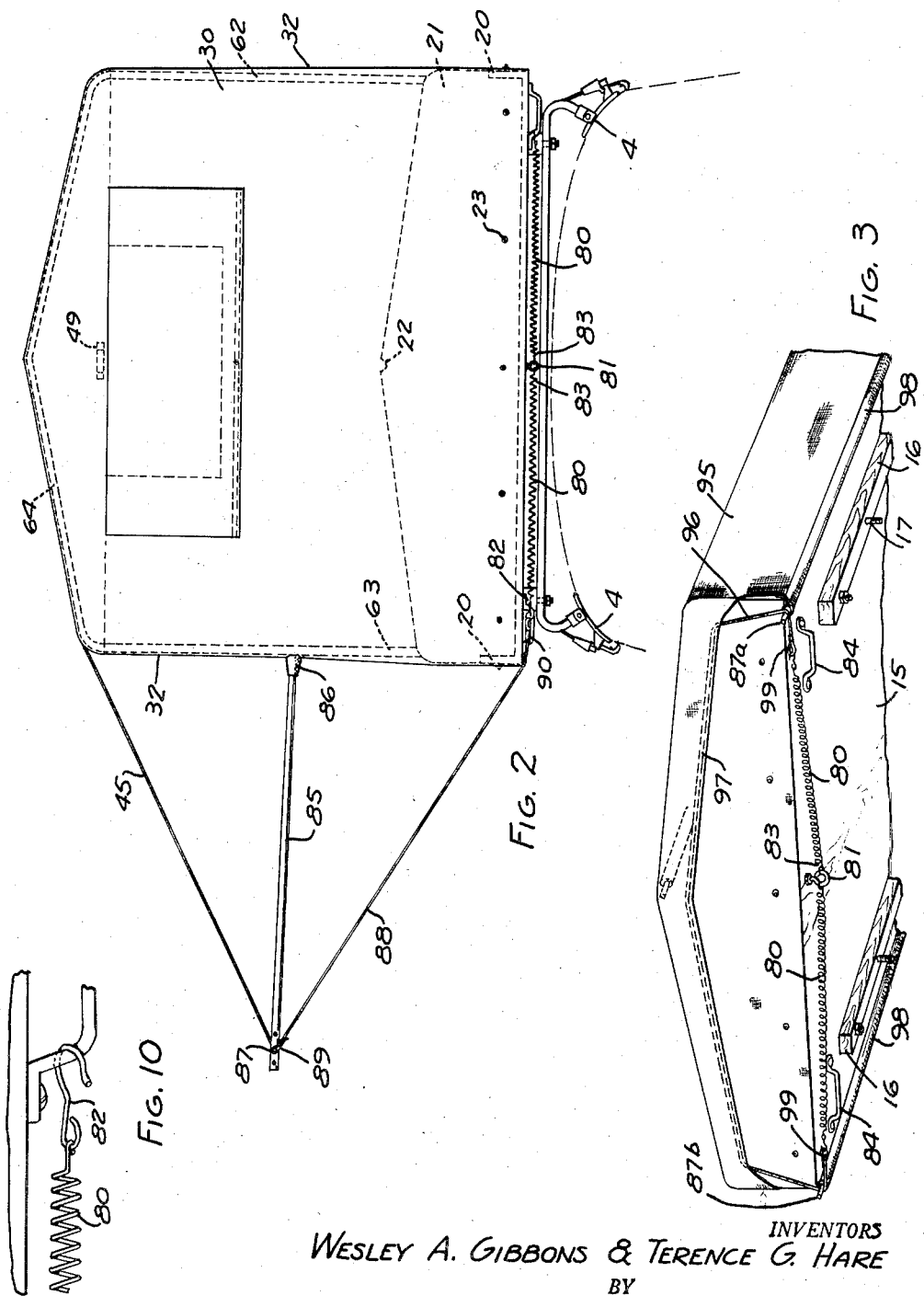

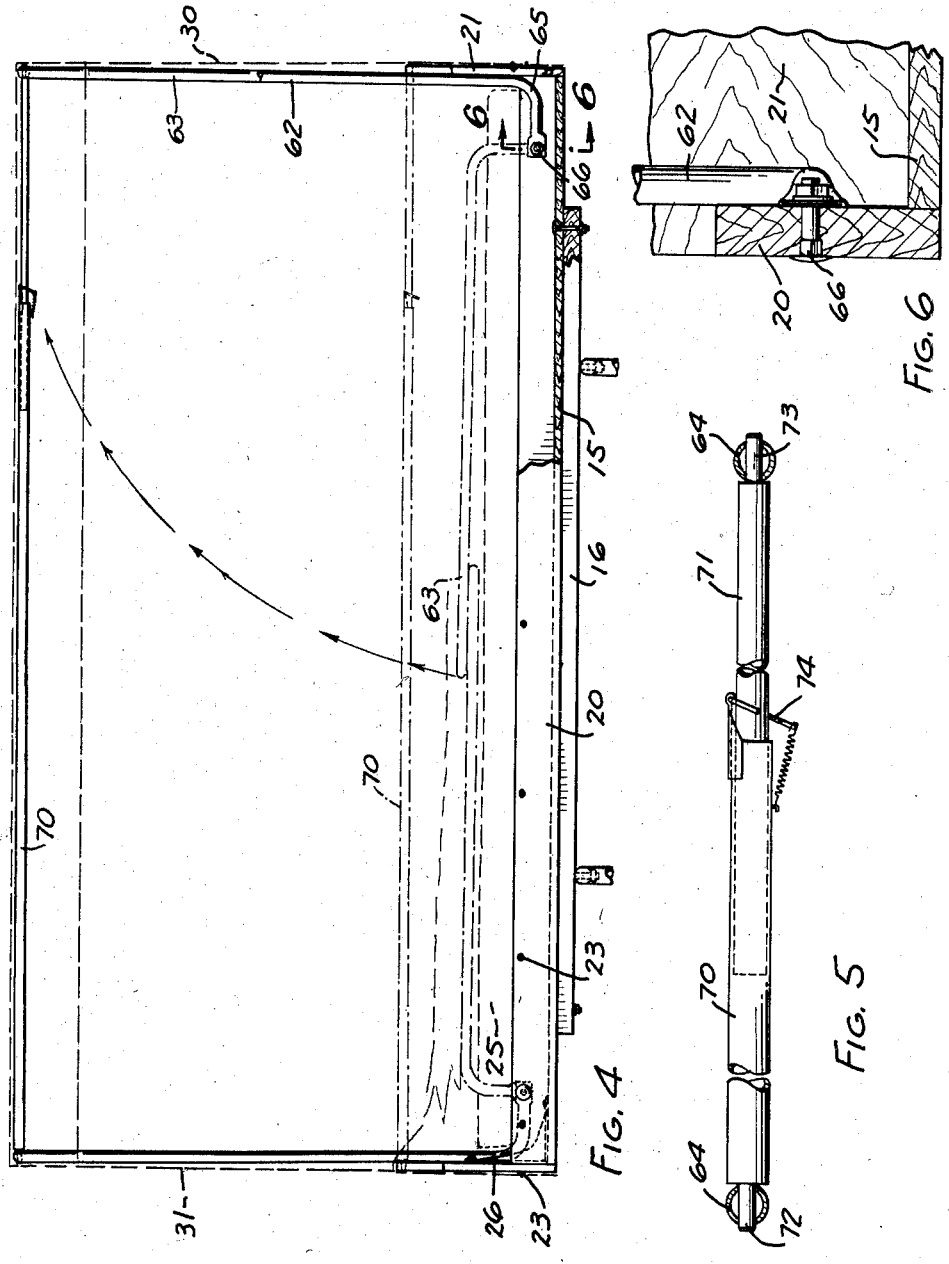

Oct. 28, 1958    W. A. GIBBONS ET AL    2,857,924
SLEEPING AND TRAVELING EQUIPMENT FOR AUTOMOBILES
Filed May 25, 1955    4 Sheets-Sheet 4

INVENTORS
WESLEY A. GIBBONS & TERENCE G. HARE
BY
Barnes, Kisselle, Laughlin & Raisch
ATTORNEYS.

United States Patent Office 2,857,924
Patented Oct. 28, 1958

2,857,924

SLEEPING AND TRAVELING EQUIPMENT FOR AUTOMOBILES

Wesley A. Gibbons, Birmingham, and Terence G. Hare, Detroit, Mich.; said Hare assignor to said Gibbons Application May 25, 1955, Serial No. 510,938

7 Claims. (Cl. 135—1)

This invention relates to equipment for attachment to the top of an automobile to provide sleeping quarters. There have been attempts heretofore made to provide foldable equipment for use with automotive vehicles to provide sleeping quarters and some of such attempts have been toward providing equipment for use on tops of automobiles. Equipment of this kind is very useful for campers, tourists, hunters, fishermen or the like, but to be satisfactory, the equipment must be such that it can be erected easily and quickly, and similarly, must be capable of being folded compactly for traveling and, moreover, must be arranged so that the compacted equipment is maintained substantially dustproof and waterproof while in transit. Furthermore, when used for sleeping purposes, the structure must be reasonably water tight and at the same time provide for adequate ventilation.

It is an object of this invention to provide an improved structure which can be erected and folded with great facility and can be easily compacted and folded, without having loose or flapping parts for transit, and which provides a minimum of excess weight. To this end the invention contemplates the use of certain yieldable holding and fastening devices which facilitates manipulation of the equipment without requiring the tying of ropes or cords, which provides for adjustable ventilation by a simple structure which does not interfere with the folding of the equipment compactly for transit and which can be mounted upon and removed from the automobile with a minimum of effort. Other objects will appear as the detailed description is considered in conjunction with the accompanying drawings.

Fig. 1 is a perspective view of the equipment mounted upon an automobile and ready for occupancy for sleeping or the like.

Fig. 2 is an end view with some parts shown in dotted lines.

Fig. 3 is a view of the equipment in compacted form.

Fig. 4 is a view with some parts shown in section and others shown in dotted lines illustrating how the structure is erected and folded.

Fig. 5 is a view illustrating a ridge pole structure.

Fig. 6 is an enlarged sectional view taken substantially on line 6—6 of Fig. 4 showing a frame mounting.

Fig. 10 is an enlarged detail illustrating a yieldable attaching element.

Figure 1:
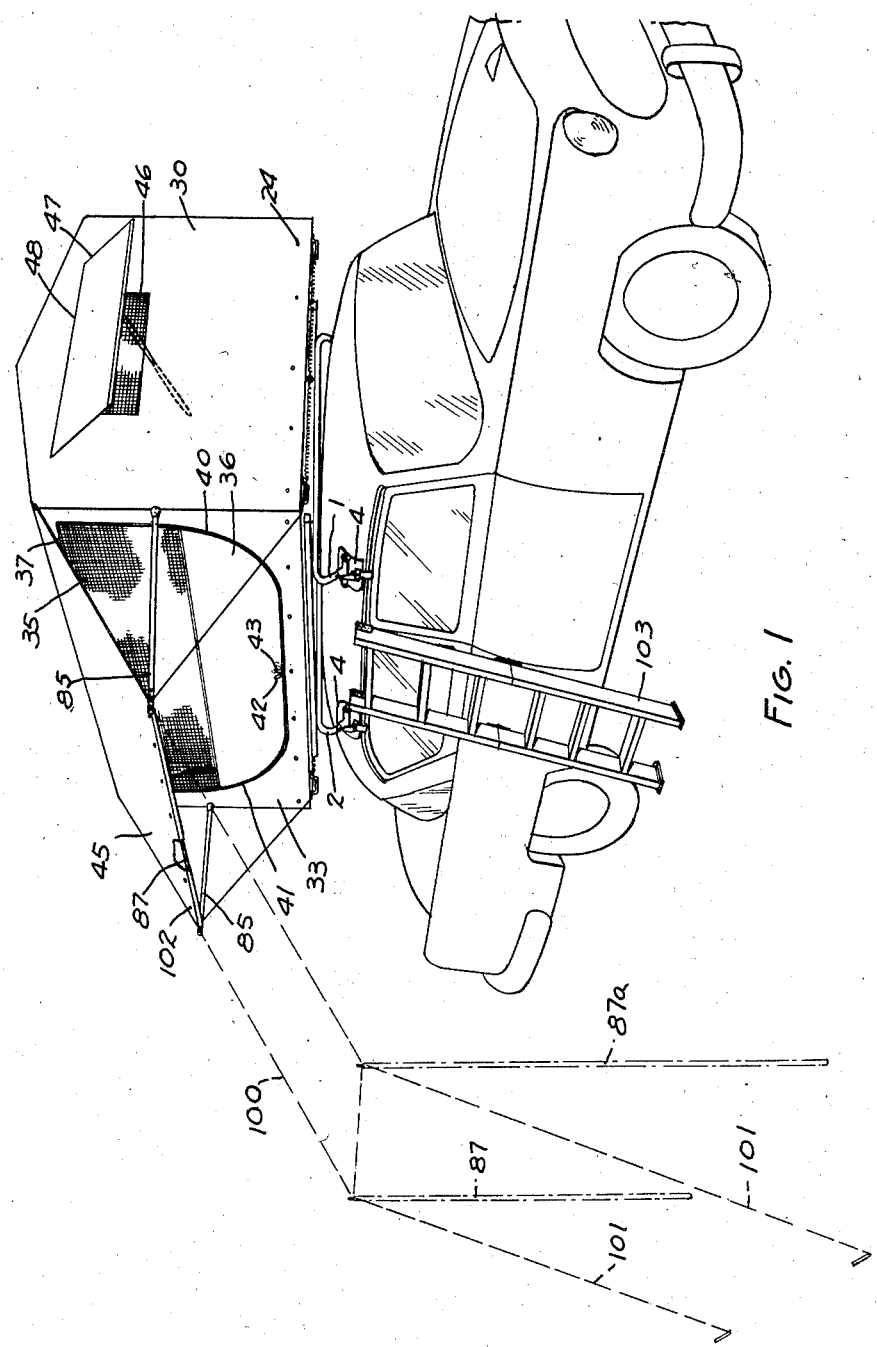
Figure 9:
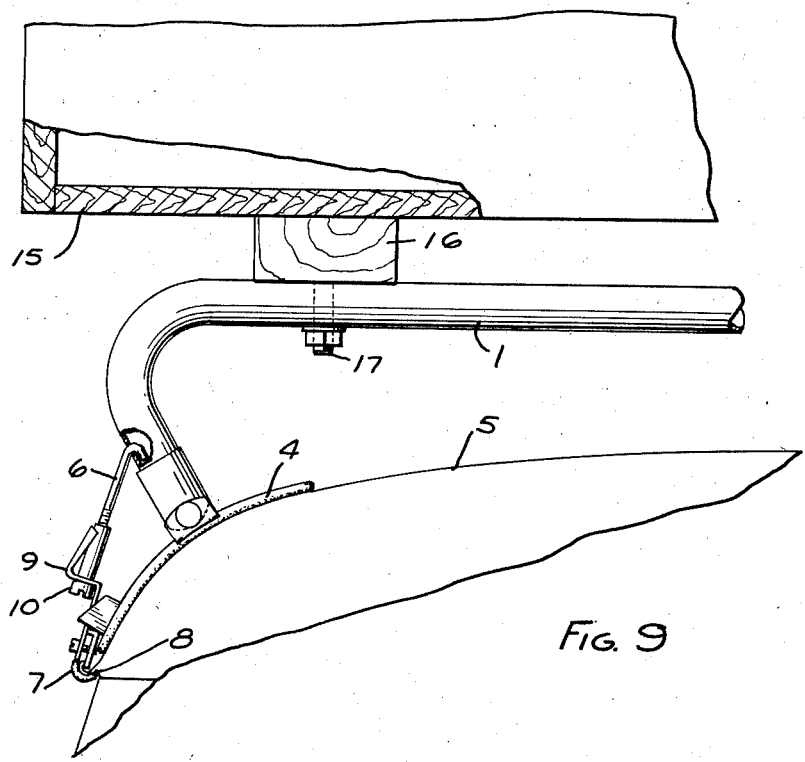
Fig. 9 is an enlarged view with some parts cut away and some parts in section illustrating a carrier structure.

At the outset the sleeping equipment is to be employed with what may be referred to as a luggage carrier, or portions thereof, for the top of a car. To this end, as shown in Figs. 1 and 9, the carrier structure involves two cross bars 1 and 2 shaped as shown in Fig. 9 and equipped with pads or plates 4 for resting on the curved portion of the top 5 of an automobile. An adjustable hold down arrangement has a hook 6 for engaging a bar and a hook 7 for engaging under the eave trough 8 of the car body, and the body of the hook 7 is suitably shaped as at 9 to receive a nut 10 threaded to the hook 6. Turning the nut tightens the assembly and holds the pad 4 on the top of the automobile.

The equipment embodies a box structure advantageously made of plywood or the like having a bottom 15 with rails 16 on the underside thereof (Fig. 3), with bolts 17 arranged to pass through the bars 1 and 2. Thus the box structure can be easily placed upon the carrying rods and bolted thereto and may be easily removed therefrom.

The sides of the box are comprised of relatively low strips 20. The ends of the box are preferably of gable shape as shown in Figs. 2 and 3. One end, as indicated in Fig. 2, is illustrated at 21. At the apex of the gable the ends are conveniently formed with a notch 22. The side strips 20 and the end panels 21 are provided with snap fastener members 23. The end boards are strongly held by brackets.

Preferably the interior dimensions of the box are such as to conveniently receive a mattress. Thus, any mattress may be selected so as to provide a bed substantially the equivalent of what a person has at home or otherwise prefers. The mattress is indicated at 25 (Fig. 4). Of course, the individual user may employ any desired mattress or pad or may even prefer to use inflatable rubber mattresses.

A tent structure is secured to the box. This tent structure has end walls 30 and 31, a back walls 32 and a front wall 33. The lower edges of the walls are provided with snap fastener elements 24 for removably engaging the elements 23 on the box.

The front wall 33 is formed with an openable flap, the upper portion of which is indicated at 35 is of screen construction, such as a cloth mosquito netting, or plastic screen, while the lower portion 36 may be of cloth. This flap is secured to the wall 33 along an upper seam 37 but the side and lower edges are joined to the wall 33 preferably by two slide fasteners 40 and 41, the slides of which are indicated at 42 and 43 and which substantially come together as shown in Fig. 1 when the flap is closed. The tent is provided with a flap 45 which may be used as an awning as will presently appear.

Figure 7:
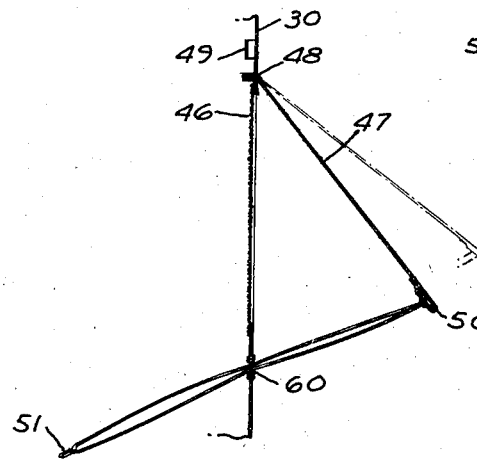
Fig. 7 is a view illustrating a ventilating flap.
Figure 8:
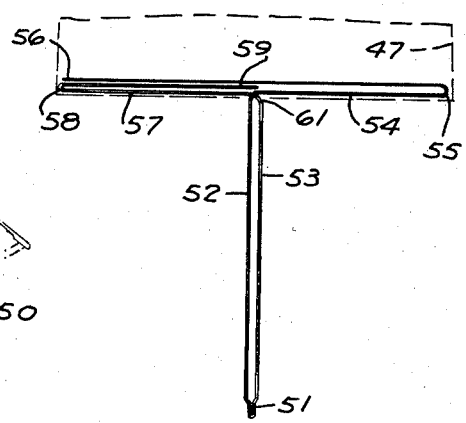
Fig. 8 is a view in the nature of a plan view showing some of the ventilating flap structure.

One or more of the walls and preferably the two end walls are provided with ventilating screened opening 46 and there is a covering flap 47 therefor. The flap 47, as shown, is stitched to the wall 30 along its upper edge as at 48. The details of this structure are shown in Figs. 7 and 8. The lower edge of the flap 47 is provided with a hem providing a hollow or tubular structure 50. In this hem is a relatively stiff member provided with an extension. Advantageously, the stiff member and extension may be formed from a single piece of steel wire bent upon itself to provide a relatively ensmalled bight 51 and two arms 52 and 52 extending therefrom. The wire is bent to form a run 54 bent reversely on itself as at 55 to provide a run terminating at 56; the other arm is bent to provide a run 57 bent upon itself as at 58 to provide a terminating end portion 59. This forms a T-shaped member with the cross bar of the T located within the hem. The arms 52 and 53 are flexible and they are passed through an eyelet or grommet 60 in the wall 30. Internal diameter of the grommet 60 is less than the dimension across the arms 52 and 53, and thus the arms 52 and 53 press outwardly and frictionally engage the eyelet. The frictional engagement will thus hold the flap 47 in any one of numerous angular positions of adjustment overlying the screened opening 46. When pushed outwardly to its limit the ensmalled bight portion 51 fits in the grommet. When pulled inwardly to close the opening the constricted part 61 which is formed by a crossing of the arms 52 and 52 reposes in the eyelet and the arms 52 and 53 may lie flush against the inside of the wall 30 and may be slipped under a loop 49 which is stitched to the wall.

The frame is preferably of tubular construction there being two frame members of like construction. The tubular frame is somewhat of U-shape having vertical arms 62 and 63 with a connecting cross portion 64 having an angular form corresponding to the gable form of the end boards of the box. Each vertical arm (Fig. 4) has a bend 65 and its extreme end is pivotally secured to a side board of the box as shown at 66. Since the end frames are identical the same reference characters are applied to both.

There is a ridge pole, as shown in Fig. 5, preferably made of telescoping tubular members 70 and 71 with projecting studs 72 and 73 and provided with a frictional latching device generally illustrated at 74. The members 70 and 71 can be adjusted by relative sliding movement and when adjusted to length the latch 74 frictionally binds against the member 71 to prevent the members from sliding in a manner to shorten the overall length. The cross portions 64 of the frame are provided with openings as indicated in Fig. 5 to receive the studs 72 and 73.

On the underside of the box and at each end thereof are two springs 80 each with a hook 83 for engaging a retaining eye 81 secured to the bottom of the box. Each spring has a hook 82 on its opposite end as shown in Fig. 10. Also on the underside of the box near each corner is a handle 84. When the spring is not in use it retains itself in position by merely engaging the hooks 82 with the handles 84, as indicated in Fig. 10.

The flap 45 may, of course, be dropped over the screened opening and it may be used as an awning. To this end, there are two rods 85 which may be positioned as shown in Figs. 1 and 2, with their inner ends equipped with elements 86 which may be rubber or plastic feet for engaging the uprights of the frame and the outer ends provided with a plurality of apertures for receiving the projecting ends of a rod 87 in a hem in the lower edge of the flap 45. Two lengths of cord or rope, as shown at 88, each have a loop 89 at one end for engaging the end of the rod 87, and a loop 90 at its opposite end is employed to stabilize the structure. The hooks 82 of the springs are engaged in the loops 90 and then the springs thus hold the structure taut without requiring the operator to pull and tighten ropes and to tie knots. When the flap 45 is closed, the hooks 82 on the springs may be engaged with the projecting ends of the rod 87 to hold the flap tightly down or into grommets (not shown) in the flap.

There is a cover 95 for covering the structure when folded as shown in Fig. 3. This is of suitable fabric, such as canvas or rubberized material, having a draw string 96 at each end contained in a hem 97. The cover has a sewn tubular structure or hem 98 along each lower edge adapted to receive each a rod or pole 87a and 87b. These poles are labeled 87a and 87b because they may be similar to the pole 87 and indeed one of them may be the same pole. When applying the cover the draw string 96 is passed around the projecting ends of the rods 87a and 87b and each draw string has a loop 99 for engagement with a hook 82 of the spring 80. Thus, the cover is drawn taut by the springs and since the rods are rigid, the cover is held down tightly from end to end.

A further use for the rod 87 or rods 87a and 87b is indicated in Fig. 1 where they serve as poles to support an additional fly 100 which may be drawn taut by tie ropes 101. The fly 100 is preferably detachably secured to the lower edge of the flap 45 by snap fasteners 102. It will be understood that only two rods 87 and 87a may be employed because a rod is not needed in the hem of the flap 45 when the fly 100 is used.

When erected, the sleeping equipment appears as shown in Figs. 1 and 2, and access thereto may be had by a foldable ladder 103 which may be carried in the luggage compartment of the vehicle. To fold the structure for transit, the rods 85 are released and the flap 45 folded down. The operator reaches in the tent and by manipulating the latch 74 shortens the ridge pole for its removal. Then the two end frames are folded down to the position shown in Fig. 4. The offset arrangement at 65 of the end frames permit the main frame portions to fold down substantially flatly on the mattress and accumulated bed clothing. Indeed, articles of clothing may be also placed on the mattress either above or below the end frames. With the end frames thus collapsed the material of the tent is folded in on top of the mattress, the folding being at some random, and other items of equipment, such as the rods 85 and cords 88, may be placed with the box. The ridge pole is mounted on the end boards by placing the studs 72 and 73 in notches 22, with the material of the tent lying under the studs. Then the cover 95 is placed over the box. If the user only has two rods, such as 87 and 87a, these are inserted through the hems 98 and then the draw strings 96 are passed over the projecting ends of the rods and engaged with the hooks 82 of the springs. If necessary, the draw strings 96 may be given one or more turns about the projecting ends of the rods. So, it will be seen that the assembly may be quickly folded and when folded and covered, everything is held dustproof and waterproof with no flapping parts, and without the necessity of manually drawing ropes or cords tightly, tying knots, etc.

To erect the equipment, the operation is the reverse. The cover is removed, in which action the hooks 82 are engaged with the handles 84, the end frames pushed to upright position, and the ridge pole set. In erecting the end frame and inserting the ridge pole, the fabric of the tent is given its shape. It will be noted that the end frames abut against the end boards of the box, as shown in Fig. 4. Due to the fact that the pivotal points 66 are removed from the end boards of the box the end frames are strongly positioned upon the positioning of the ridge pole. Considerable space is provided within the folded structure due to the gable formations of the end boards of the box so that there is ample space for carrying extra bed clothing, clothes and indeed some other equipment. If the user only has two poles one may be removed from the cover and inserted in the flap 45. It will be noted that the covering for the screened opening 46 is substantially larger than the screened opening so that when it is closed a good weather-tight structure is provided. The whole structure is fairly light in weight and the handles 84 facilitate placement thereof on the vehicle and removal therefrom. To remove the structure it is only necessary to remove the nuts from the hold down bolts 17 and then the luggage carrier can be used for other purposes.

We claim:

1. In sleeping equipment for an automobile, a box structure adapted to be mounted on the top of an automobile and being of such a size as to receive and retain a pad or mattress, a tent structure secured to the box, foldable frame members secured to the box for holding the tent structure erected and the frame members being foldable into the box and the tent structure being collapsible into the box, a separate cover of flexible material having sides and ends, said cover being applicable over the box with said sides and ends extending downwardly of the top edges of said box, said cover having a draw string at each end, said cover having means adjacent the lower edge of each side for receiving a rod; a spring element on the underside of each end of the box; said rods extending beyond the end walls of the box, each draw string adapted to be passed around the projecting ends of opposite rods, and hook means for connecting the ends of the draw string to the spring element.

2. The structure as recited in claim 1 characterized in that the box structure has end boards and side boards and the end boards are of gable formation and extend higher than the side boards, a ridge pole detachably engageable with the erected frame members, and means at the apices of the end boards for detachably receiving the ridge pole, when the frame members and tent are folded and collapsed, for supporting the cover.

3. In sleeping equipment, such as a tent, a tent wall having an opening therein, a flap secured to the outside of the tent wall above the opening and having free lower and side edges, a stiffening element secured to the lower edge of the flap, a member projecting from the stiffening element and comprising a plurality of spaced yieldable elements, a grommet in the wall of the tent below the opening therein, said projecting member being slidably positioned in the grommet and the spacing between the yieldable elements being in excess of the cross dimension of the grommet, whereby to yieldably and frictionally engage the grommet, so that the projecting member may be adjustably positioned therein to hold the flap in angularly adjusted position overlying but spaced from the opening.

4. In sleeping equipment, such as a tent, or the like, a wall of a tent having an opening therein, a flap secured to the wall along its upper edge above the opening and having free lower and side edges, a grommet in the wall of the tent, and a projecting device in the form of a plurality of spaced yieldable wire-like members secured to the flap and extending through the grommet, the spacing between the wire-like members being in excess of the cross dimension of the grommet, so as to frictionally engage the grommet, whereby said projection is adjustable in the grommet to hold the flap in adjusted angular position relative to the said wall of the tent.

5. The structure as recited in claim 4 characterized in that the said projecting device comprises two spaced lengths of spring wire and that the grommet is located in the wall of the tent below the opening therein.

6. In sleeping equipment, such as a tent, a tent wall provided with an opening, a flap secured to the tent wall along its upper edge and above the opening, said flap having free side edges and lower edges, a grommet in the wall of the tent and below the opening, and a member of T-shape fashioned from a length of yieldable wire-like metal stock with the cross bar of the T secured to the lower edge of the flap, and with the vertical part of the T composed of two wire-elements spaced from each other a distance greater than the cross dimension of the grommet, and being disposed in the grommet, whereby the same yieldably and frictionally engages the gommet, so that the flap may be held angularly adjusted relative to the wall of the tent and closed flush against the wall of the tent.

7. In sleeping equipment for an automobile, a shallow box having side boards and end boards adapted to be mounted on the top of an automobile, said box being of such a size as to receive and retain a mattress pad or the like, the end boards being of gable formation and extending substantially higher than the side boards, a frame member for each end of the box, each frame member having a pair of upright arms and a connecting cross piece also of gable formation, a ridge pole detachably connected to the apices of the gable formed cross pieces, said frame members and ridge pole being adapted to support a tent structure over said box, said frame members being foldable into said box when said ridge pole is detached therefrom, said ridge pole also being detachably connectable to the apices of the gable formed end boards of said box, and a cover of flexible material having sides and ends, said cover being applicable over said ridge pole and box with said sides and ends extending downwardly of the top edges of said box, and means detachably securing said sides and ends of said cover to said side boards and end boards of said box so that when said cover is applied over said box said gable formed end boards and ridge pole cooperate to impart to said cover a gabled formation for shedding water.

References Cited in the file of this patent

UNITED STATES PATENTS

| | | |
|---|---|---|
| 1,434,841 | Pittoni | Nov. 7, 1922 |
| 1,499,972 | Canfield | July 1, 1924 |
| 1,631,215 | Leffert | June 7, 1927 |
| 1,856,658 | Rummler | May 3, 1932 |
| 2,683,265 | Wayne | July 13, 1954 |
| 2,804,083 | Wieber | Aug. 27, 1957 |